Aug. 22, 1939.　　　　C. R. GRANTHAM　　　　2,170,715
SWITCH AND OPERATOR THEREFOR
Filed Aug. 22, 1938
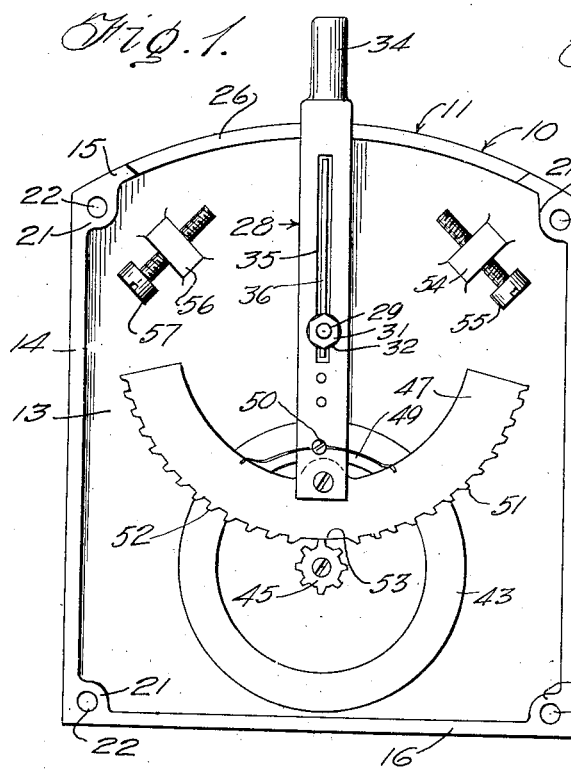
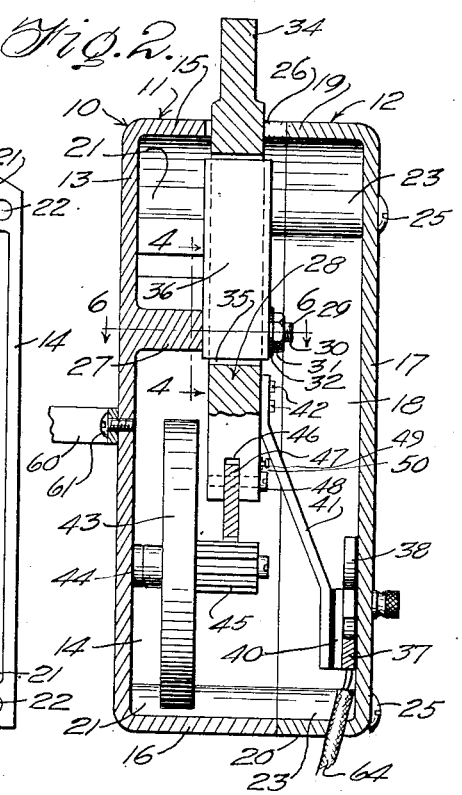
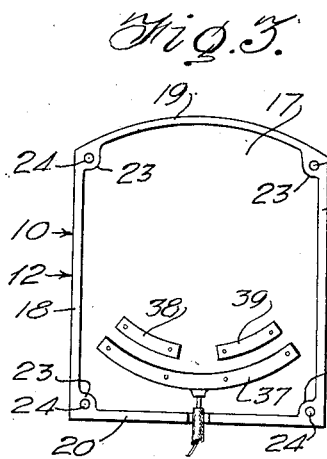
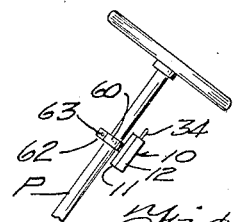
Inventor
CHARLES R. GRANTHAM,
By Kimmel & Crowell,
Attorneys.

Patented Aug. 22, 1939

2,170,715

UNITED STATES PATENT OFFICE 2,170,715

SWITCH AND OPERATOR THEREFOR

Charles R. Grantham, Washington, D. C.

Application August 22, 1938, Serial No. 226,200

6 Claims. (Cl. 200—33)

This invention relates to switches and more particularly to a switch adapted for use in the operation of vehicle signal devices.

An object of this invention is to provide an improved switch structure which is constructed for use in signalling devices, particularly such devices as indicate changes in direction of a vehicle so that approaching or following vehicles will be appraised of change in direction of the particular vehicle.

Another object of this invention is to provide an exceedingly simple switch and operator therefor which is so constructed that the switch will automatically move to a disengaged position after having initially been moved to a switch closing position, the device being so constructed as to maintain the switch in a circuit closing position for a sufficient period of time to cover the change in direction of the particular vehicle.

A further object of this invention is to provide a switch and operator therefor which is constantly urged to a circuit breaking position, but which after being moved to a circuit closing position is rotated in its movement to a disengaged position so that the switch will be maintained in a circuit closing position for the desired period of time.

A still further object of this invention is to provide a switch structure of this kind which can be moved to a circuit closing position by a simple movement of a finger and which may be mounted at any desired and convenient position either on the steering column of a vehicle, the dash board, or any other desired location.

To the above ends essentially and to others which may hereinafter appear, the invention consists of the novel construction, combination and arrangement of parts as will be more specifically described and illustrated in the accompanying drawing wherein is shown an embodiment of the invention, but it is to be understood that changes, variations and modifications may be resorted to which fall within the scope of the invention as claimed.

In the drawing:

Figure 1 is a detail front elevation of a switch operator constructed according to an embodiment of this invention with the cover thereof removed and the wiper removed from the operator, Figure 2 is a longitudinal section partly broken away of the device, Figure 3 is a detail inside view on a reduced scale of the cover carrying the contacts associated with this device, Figure 4 is a fragmentary sectional view taken on the line 4—4 of Figure 2, Figure 5 is a detail side elevation on a reduced scale of a device constructed according to an embodiment of this invention mounted on a steering column, Figure 6 is an enlarged fragmentary sectional view taken on the line 6—6 of Figure 2, and Figure 7 is a fragmentary front elevation of a modified form of operator for the switch.

Referring to the drawing, the numeral 10 designates generally a casing formed of an inner part 11 and a cover 12. The inner part 11 comprises a rear wall 13, forwardly extending side walls 14, a top wall 15, and a bottom wall 16. The cover 12 comprises a front wall 17, side walls 18 adapted to abut against the side walls 14, a top wall 19, and a bottom wall 20. The inner casing member 11 is provided in the corners thereof with enlarged portions 21 which are provided with threaded openings 22, and the cover 12 is provided with enlarged portions 23 in the corners thereof having openings 24 so that fastening members in the form of bolts or screws 25 may tightly secure the cover 12 on the body or back part 11.

The top 15 of the back portion 11 is preferably arcuate in configuration and is provided with an elongated slot 26. The back wall 13 at a point below the top wall 15 is provided with a forwardly extending lug or post 27, and a switch operating lever 28 is rockably mounted on this lug 27 which adjacent the forward end thereof is provided with a reduced cylindrical portion 29 having threads 30 on which a nut 31 engages. A washer 32 is interposed between the nut 31 and the outer side of the lever 28 so as to rockably hold the lever 28 against the shoulder 33 formed between the reduced portion 29 and the inner part of the lug or post 27. The lever 28 extends outwardly and upwardly through the slot 26 and is provided at its upper end with a handle or operator 34. In this manner the lever 28 may be rocked longitudinally of the slot 26.

The lever 28 is provided with an elongated slot 35 therethrough and a resilient member in the form of an elongated flat spring 36 is disposed in this slot 35. The spring 36 is fixed to the cylindrical or bearing part 29 of the lug 27 and in its normal position the spring 36 will be upright as shown in Figure 1.

The front wall 17 of the cover 12 is provided with an arcuate contact 37 which is adapted to be connected to one side of an electrical circuit forming part of a signal device and cover 12 is also provided on the inner side of the front wall 17 thereof with spaced apart contacts 38 and 39 which are spaced from each other and from the elongated circuit contact 37. These contacts 38 and 39 are adapted to be connected to a signal device such as signal lights, one showing a left turn and the other showing a right turn so that when the circuit is closed through the signal contacts 38 and 39 the proper signal light will be energized.

A wiper 40 carried by a forwardly and downwardly extending arm 41 is adapted to bridge the contact 37 and one of the contacts 38 or 39 depending on the position of the wiper 40. The arm 41 is secured as by bolts or screws 42 to the forward side of the operating lever 28.

In order to provide a means whereby upon swinging of the lever 28 to a circuit closing position and the return of the lever 28 to a circuit breaking position, I have provided a fly wheel or weighted member 43 which is rotatably mounted on a stud 44 carried by the back wall 13. The wheel member 43 on its forward side is provided with a relatively small pinion or toothed wheel 45.

The lever 28 at its lower end is provided with a slot 46 in which an arcuate ratchet member 47 engages. The ratchet member 47 is secured in the slot 46 by means of a bolt 48, and the ratchet member 47 is rockable relative to the lever 28. A spring 49 engaging about a pin 50 carried by the lever 48 holds the ratchet member 47 in a neutral position with the lever 48 radial with respect to the arc of the ratchet member 47.

The ratchet member 47 on its lower side or edge is provided with ratchet teeth 51 and ratchet teeth 52. The teeth 51 are inclined in a direction opposite from the teeth 52. The ratchet member 47 is also provided with a blank space 53 between the inner ends of the teeth 51 and 52 so that when the lever 48 is in a neutral or upright position, the teeth of the pinion 45 will be out of engagement with the teeth 51 or 52 carried by the ratchet member 47.

The back wall 13 is provided at one side of the lever 28 with a forwardly extending lug 54 through which a lever controlling stop bolt 55 is threaded. The back wall 13 is also provided on the opposite side of the lever 28 with a second lug 56 through which an adjustable lever controlling bolt 57 is threaded. These bolts 55 and 57 are adapted to regulate the rocking movement of the lever 28 so that the period of the engagement of the wiper 40 with the contact 37 and one of the contacts 38 or 39 may be regulated.

In Figure 7 there is disclosed a modified form of switch operator wherein the lever 28ª is provided at the lower end thereof with a ratchet member 47ª having teeth 51ª and 52ª similar to the teeth 51 and 52 of the ratchet 47. The ratchet member 47ª is adapted to engage a pinion 45ª carried by a relatively large gear wheel 58 which meshes with a relatively small gear wheel 59 carried by the fly wheel 43ª. In this manner the tension of the spring returning the lever 28ª to a normal upright position wherein the circuit to the signal is broken will be retarded by reason of the fact that the fly wheel 43ª will be speeded in its rotation through the step-up gearing 58 and 59.

The housing 10 is adapted to be mounted on a steering post P by means of an arcuate clamp 60 secured to the rear wall 13 by means of a screw or fastening device 61. The clamp 60 is provided with spaced arms 62 which are drawn toward each other by means of a bolt or screw 63. In this manner the housing 10 may be mounted in any desired position along the length of the post P. However, if desired, the housing 10 may be secured as by bolts or screws to the dash board or any other desired supporting means.

In the use and operation of this device, the contact 37 is adapted to be connected to a suitable source of current supply by means of a conductor 64, and the signal contacts 38 and 39 are adapted to be connected one to each of a pair of signal lights, preferably lights indicating a left and a right turn.

When the operator of the vehicle desires to give a signal to approaching and following vehicles as to a prospective change in direction, the handle 34 is rocked, as an example, toward the left so that the wiper 40 will engage the contact 38 so that the signal light associated with this contact will be lighted. After moving the lever 28 to the left the operator of the vehicle may then release the lever and the spring 36 will then urge this lever 28 back to a normal circuit breaking position. However, as the lever 28 is moved to the left, the ratchet teeth 52 will ride over the pinion 45, the ratchet member 47 rocking as the teeth 52 ride over the teeth of the pinion 45. When the handle 34 is released, the spring 36 will move the lever 28 to a disengaged position, but this movement will be retarded by reason of the fact that the teeth 52 on the return movement of the lever 28 will engage the teeth of the pinion 45 so as to rotate this pinion 45 and also the fly wheel 43.

The weight of the fly wheel 43 is such that the spring 36 may readily rotate the fly wheel so that the spring 36 may finally assume an upright position wherein the wiper 40 is directly between the two contacts 38 and 39. The spring 49 will resiliently hold the ratchet member 47 in engagement with the pinion 45 during the swinging movement of the ratchet member 47. The lever 28 is moved toward the left to the limit permitted by the adjustable stop member 57 which adjustable stop member may be adjusted toward or away from the neutral position of the lever 28 and thus limit the swinging movement of the lever 28 in one direction.

The swinging movement of the lever 28 in the opposite direction is limited by the adjustable stop member 55.

A combined switch and switch operator constructed according to this invention will permit the closing of a circuit to the desired signal light for a sufficient length of time so that the operator of the vehicle may give the signal prior to the actual change in direction of the vehicle, and the signal will be maintained in its lighted condition for a sufficiently long period of time so that the change in direction may be completed with the signal lighted. This device will automatically break the circuit to the signal and in view of the simplicity of the device, it may be constructed and manufactured at a relatively small cost.

What I claim is:

1. In combination a switch and an operator therefor comprising a housing including a base, a cover, means securing said cover on said base, a set of three spaced contacts carried by said cover, two of said contacts being selectable and the other being for coaction with a selected contact, a rock lever, a pivot carried by said base engaging said lever to swingably mount said lever on said base, a circuit closer in the form of a wiper for travelling against the contacts of said set, engageable with said contacts, means securing said wiper to said lever, yieldable means carried by said pivot engaging said lever internally of the latter constantly urging said lever to a normal disengaging position, an arcuate ratchet swingably carried intermediate its ends by said lever and formed with spaced oppositely disposed sets of teeth and toothed rotatable lever retarding means carried by said base selectably engageable with a selectable set of teeth to retard the swinging movement of said lever from an engaging position to a normal disengaging position.

2. In combination a switch and an operator therefor comprising a closed housing, a set of contacts carried by a wall of said housing, said set including a pair of selectable endwise aligned spaced short contacts, and a long contact spaced from and common to the short contacts and for coaction with a selected short contact, a normally inactive rock lever in said housing, means rockably supporting said lever in said housing, a circuit closure in the form of a wiper for travelling against the contacts of said set to bridge a selected short contact and said long contact, means securing said wiper to said lever, yieldable means constantly urging said lever to inactive position, an arcuate toothed member rockably carried by said lever, a fly wheel, means rotatably mounting said fly wheel in said housing, a pinion fixed to said fly wheel and engageable with said toothed member whereby to retard the swinging movement of said lever, and means carried by said housing disposed on opposite sides of said lever to limit the swinging movement of said lever.

3. In combination a switch and an operator therefor comprising a housing including a base and a cover, a plurality of spaced apart contacts carried by said cover, a rock lever in said housing, said housing having an elongated slot, a handle carried by said lever projecting through said slot, means rockably supporting said lever in said housing, a spring carried by said supporting means engaging said lever to normally hold said lever in an upright disengaged position, a wiper, means securing said wiper to said lever, an arcuate bar, means pivotally securing said bar to an end of said lever, a plurality of inclined teeth carried by said bar, certain of said teeth being inclined in one direction and certain others of said teeth being inclined in an opposite direction, a weighted member, means rotatably supporting said weighted member in said housing, a pinion fixed relative to said weighted member engageable with said teeth upon rocking of said lever whereby to rotate said weighted member upon swinging of said lever from an engaging position to a disengaging position and yieldable means engaging said lever and said bar for yieldably holding the teeth of said bar in contact with said pinion.

4. The invention as set forth by claim 2 having said yieldable means being disposed within and lengthwise of said lever and having one end secured to the means for rockably supporting said lever.

5. In combination, a switch and an operator therefor comprising a housing, a set of contacts carried by a wall of the housing, said set including a pair of spaced selectable short contacts and a long contact spaced from and common to the pair of short contacts and for coaction with a selected short contact, a normally inactive rock lever in said housing, means rockably supporting said lever in said housing, a circuit closer in the form of a wiper for travelling against the contacts of said set to bridge a selected short contact and said long contact, means securing said wiper to said lever, yieldable means constantly urging said lever to inactive position, a toothed member rockably carried by said lever, a fly wheel, means rotatably mounting said fly wheel within the housing, a rotatable toothed connection between the fly wheel and said member for retarding the swinging movement of said lever, and means within the housing and disposed on opposite sides of the lever to limit the swinging movement of the latter.

6. The invention as set forth by claim 5 having the said yieldable means being disposed within and lengthwise of said lever and having an end terminal portion thereof anchored stationary to the means for rockably supporting said lever.

CHARLES R. GRANTHAM.